United States Patent
Ruffa

(10) Patent No.: US 10,042,067 B1
(45) Date of Patent: Aug. 7, 2018

(54) SAFETY SYSTEM FOR A TOWED SOURCE

(71) Applicant: Anthony A Ruffa, Hope Valley, RI (US)

(72) Inventor: Anthony A Ruffa, Hope Valley, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/713,890

(22) Filed: Sep. 25, 2017

(51) Int. Cl.
  *G01V 1/38* (2006.01)
  *B66C 13/02* (2006.01)
  *B63B 21/66* (2006.01)

(52) U.S. Cl.
  CPC ............ *G01V 1/3843* (2013.01); *B66C 13/02* (2013.01); *B63B 21/66* (2013.01)

(58) Field of Classification Search
  CPC .............................. G01V 1/3843; B63B 21/66
  See application file for complete search history.

(56) References Cited

U.S. PATENT DOCUMENTS

| | | | | |
|---|---|---|---|---|
| 1,433,079 A * | 10/1922 | Jett | ......................... | B66D 1/48 212/272 |
| 3,160,360 A * | 12/1964 | Lukas | .................... | B63B 35/816 242/388.91 |
| 3,361,080 A * | 1/1968 | Born | ....................... | B63B 27/18 104/114 |
| 3,938,751 A * | 2/1976 | Kawakami | ............. | B65H 51/20 242/365.7 |
| 4,050,673 A * | 9/1977 | Nishimura | ................ | B66F 7/04 254/89 H |
| 4,058,277 A * | 11/1977 | Kozakiewicz | ............ | B64F 3/00 244/17.13 |
| 4,277,053 A * | 7/1981 | Simon | ..................... | B66C 23/52 254/326 |
| 4,318,533 A * | 3/1982 | Port | ........................ | B65H 59/38 254/273 |
| 4,726,315 A * | 2/1988 | Bell | ....................... | G01V 1/3843 114/244 |
| 4,760,992 A * | 8/1988 | Peppel | ..................... | B63B 21/16 242/155 R |
| 5,140,927 A * | 8/1992 | Tolefson | ................ | B63B 39/02 114/244 |
| 5,284,323 A * | 2/1994 | Pawkett | .................. | B63B 21/66 254/134.3 SC |

(Continued)

*Primary Examiner* — Michael E Gallion
(74) *Attorney, Agent, or Firm* — James M. Kasischke; Michael P. Stanley

(57) ABSTRACT

A safety system and method of use is provided for a tow cable handling system. In use, the cable is from a winch and onto a sheave where a cable tension surge is transmitted to a meter and onto a software element. The software of a controller determines torque needed from a motor to increase winch speed to unreel cable to relieve the surge but not too much that the cable will unreel off the winch. Once the surge concludes, the motor reverses and decreases speed of the winch. If the tension surge is transient, then the motor can increase the winch speed and then slow down the winch before the cable completely unreels. The sheave is suspended by a spring and a dashpot for an over-damped response to increase the time for the winch to speed up to an acceptable speed.

2 Claims, 1 Drawing Sheet

(56) References Cited

U.S. PATENT DOCUMENTS

| | | | | |
|---|---|---|---|---|
| 5,361,565 A * | 11/1994 | Bayer | ............... | A63J 1/028 |
| | | | | 254/270 |
| 5,381,909 A * | 1/1995 | Warnan | ............... | B63B 21/66 |
| | | | | 114/244 |
| 5,458,216 A * | 10/1995 | Tanaka | ............... | B66B 1/3492 |
| | | | | 187/373 |
| 5,833,216 A * | 11/1998 | Husmann | ............... | F16F 15/121 |
| | | | | 187/343 |
| 6,390,952 B1 * | 5/2002 | Wilson | ............... | A63B 69/0048 |
| | | | | 182/71 |
| 2005/0179020 A1 * | 8/2005 | Taylor | ............... | B66D 1/485 |
| | | | | 254/270 |
| 2010/0054078 A1 * | 3/2010 | Thompson | ............... | B63B 21/66 |
| | | | | 367/20 |
| 2010/0137772 A1 * | 6/2010 | Tanaka | ............... | B66D 1/38 |
| | | | | 602/33 |
| 2012/0060597 A1 * | 3/2012 | Lee | ............... | B66B 5/0037 |
| | | | | 73/121 |
| 2015/0266704 A1 * | 9/2015 | Jewell | ............... | B66C 13/18 |
| | | | | 414/803 |
| 2017/0293042 A1 * | 10/2017 | Dudley | ............... | B63B 21/56 |
| 2017/0306749 A1 * | 10/2017 | Van Der Ende | ............... | E21B 47/04 |
| 2017/0341714 A1 * | 11/2017 | Barry | ............... | B63B 21/66 |

* cited by examiner

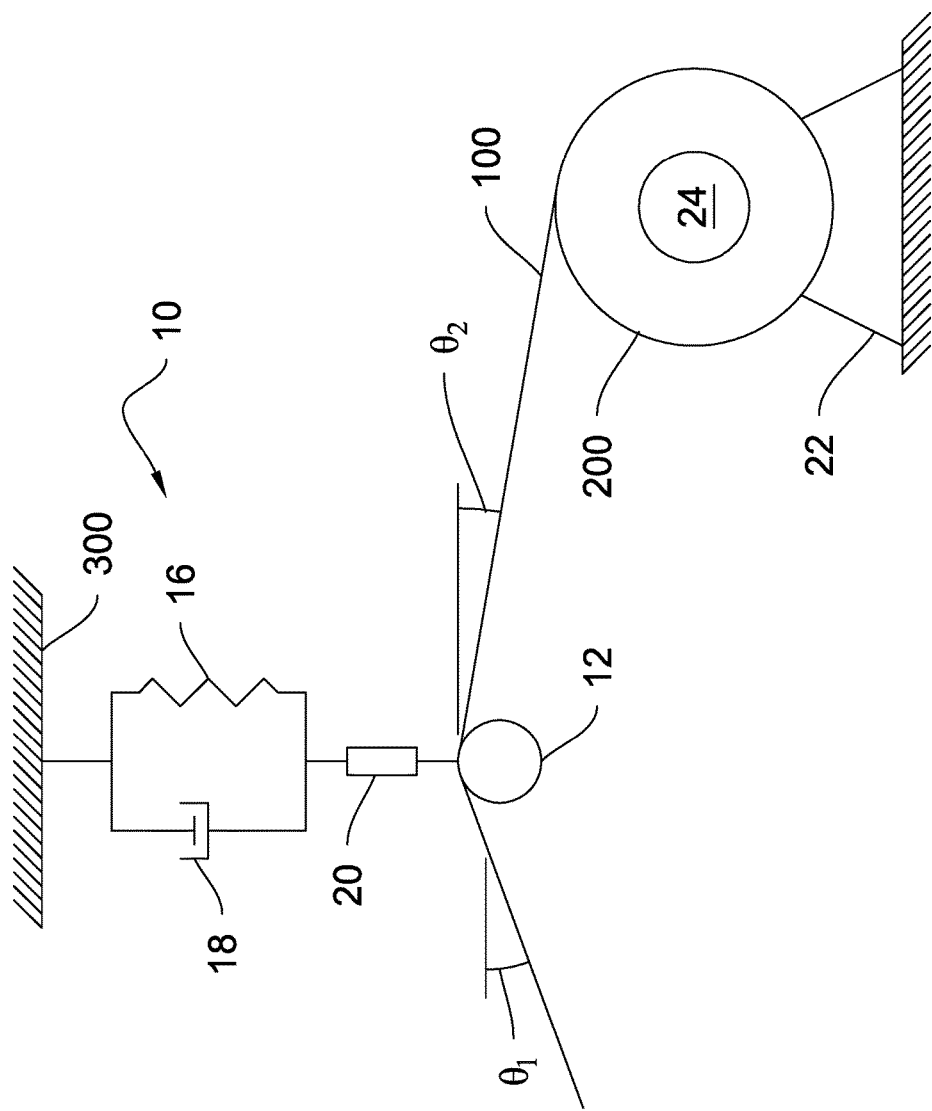

SAFETY SYSTEM FOR A TOWED SOURCE

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

(1) Field of the Invention

The present invention is a towed array safety system and method of use that prevents the loss of a towed array cable and towed array handling system in the event of a tension surge while retaining required safety features of the towed array handling system.

(2) Description of the Prior Art

There have been numerous advances in variable depth sonar (VDS) systems but relatively few VDS systems are practical for fleet use. This impracticality is because of the larger handling systems required for variable depth sonar systems. Towing variable depth sonar from a legacy handling system or from a system that could actually fit on a ship represents a major challenge.

When a tow cable snags, cable tension can surge and can quickly approach the cable breaking strength. These large cable tension loads can lead to a failure of a winch shaft, the foundation of the winch or the fairlead foundation of the handling system. A failure of any of these systems would be catastrophic and can lead to a loss of life.

The present way to prevent this failure involves the use of a handling system with a rated load that is higher than the cable breaking strength to ensure that the tow cable breaks first. To obtain sufficient working loads, typical steel-armored cables that are used in towed sonar systems can exceed a breaking strength of one hundred thousand pounds.

Transmitting sonar often require twenty kilowatts or more of electric power sent through a tow cable to a tow body. This electrical load requires such a significant amount of copper for the conductors that the need can increase a diameter of the tow cable to one and a half inches or more. A cable with a diameter of one and a half inches can have a breaking strength of up to one hundred and thirty-five thousand pounds.

Known systems to ensure the safety in the event of a cable snag involve the loss of the towed cable system. As such, there is a need for an alternative for handling the cable snagging problem that addresses safety issues in a way other than designing a tow cable to a rated load higher than the breaking strength of the cable.

SUMMARY OF THE INVENTION

Accordingly, it is a general purpose and primary object of the present invention to provide a system and method of use that prevents loss of a towed cable system in the event of a tension surge.

To obtain the object of the present invention, a system and method of use is provided which includes a tension meter that detects a measured tension exceeding a preset threshold. Exceeding the threshold indicates a tension surge. A software tool recognizes the tension surge and almost instantaneously estimates the torque required for unreeling the tow cable with the torque based on the amount of tow cable stored on the winch and a minimum winch diameter.

Also and once a tension surge is detected, a high-powered motor automatically starts with a torque and speed based on a estimate of the torque required as determined by the software. The motor supplies an initial torque required to overcome rotational inertia during the unreeling of the tow cable caused by snagging and tension surge. The software tool also tracks how much of the tow cable was deployed and how much tow cable remains on the winch. A large amount of cable stored on the winch increases the rotational inertia.

Conversely, a small amount of cable stored on the winch requires less initial torque and thus less speed up of the winch before a slowdown of the unreeling begins. The motor can then apply an accurate initial torque needed to unreel the tow cable to relieve the tension surge. Before the remaining tow cable unreels, the motor can then slow down and can stop the winch before the cable is lost.

The system is mechanically over-damped to increase a time constant of a transient tension surge. The over-dampened towed array safety system thus increases the time required to apply a necessary torque to speed up the winch.

The tension of the tow cable is monitored throughout the entire process. The tension surge is considered to be over when the tension decreases below a threshold value such as a steady-state tension before the surge. Once the tension surge concludes, the motor reverses and decreases speed of the winch to prevent loss of the cable and the handling system. An amount of reverse torque is also precomputed.

BRIEF DESCRIPTION OF THE DRAWINGS

Other objects, features and advantages of the present invention will be better understood by means of a detailed description of the drawings that illustrate the principals of the present invention in which the FIGURE depicts a towed array safety system of the present invention.

DETAILED DESCRIPTION OF THE INVENTION

In the FIGURE, a towed array safety system 10 of the present invention is shown. In use, a tow cable 100 of the safety system 10 is wound on a winch 200 and forms angles $\theta_1$ and $\theta_2$ with respect to the horizontal as the cable runs on a pulley or sheave 12. The significance of the angles $\theta_1$ and $\theta_2$ is that the vertical force on the sheave is $T \sin \theta_1 + T \sin \theta_2$, where T is the cable tension.

The sheave 12 also provides a measure of compliance in the event of a tension surge since the sheave can move vertically by a spring element 16 to relieve tension. Compliance is the force generated by a cable snag that will cause the sheave to move down and change the cable geometry (i.e., $\theta_1$ and $\theta_2$); thereby preventing the tension from increasing.

The sheave 12 is suspended by a spring/mass device attached to a secure surface 300 that includes a spring 16 and a dashpot 18 designed for an over-damped response in a vertical degree of freedom. The schematically shown spring 16 can be a coil spring, which is well known in the prior art, and includes an elastic coiled wire that resists stretching. The dashpot 18 is shown schematically and is well known in the prior art. The dashpot 18 can be similar to a shock absorber, which uses a hydraulic cylinder and forces fluid through an orifice to produce friction and damp the motion.

The over-damped response in the vertical degree of freedom will increase the response time which will lead to more time for the winch 200 to power up to an acceptable speed. Over-damping only applies to the motion of the sheave 12. Over-damping is mechanically accomplished through the selection of m, c, and k so that $c^2>4mk$ thereby leading to a determination of the vertical motion in the vertical degree of freedom by Equation [1]:

$$m\ddot{x}+c\dot{x}+kx=u_s(t) \qquad [1]$$

where m is the mass of the sheave 12, c is the damping of the dashpot element 18, k is the stiffness of the spring element 16, and $u_s(t)$ is the unit step function. The unit step function $u_s(t)$ is defined as $u_s(t)=0$; $t<0$ and $u_s(t)=1$; $t\geq 0$.

The towed array safety system 10 should be over-damped increase a time constant of a transient tension surge.

It is important that the energy resulting from the cable snag is distributed over a larger time duration, so that an unreeling mechanism can start up and unreel more cable over the longer duration rather than the original (much shorter) duration of the surge that would otherwise occur.

Taking the Laplace transform leads to Equation [2]:

$$[ms^2+cs+k]X(s)=1/s. \qquad [2]$$

As an example in Equation [3], for $m=1$, $k/m=2$, $$X(s) = \frac{1}{s(s+1)(s+2)} \qquad [3]$$

Taking the inverse Laplace transform leads to Equation [4]:

$$x(t) = \frac{1}{2}[1 - 2e^{-t} + e^{-2t}] \qquad [4]$$

The over-dampened towed array safety system 10 thus increases the time scale (reflected in Equation [4]) required to apply a necessary torque to speed up the winch 200.

During operation of a tow cable handling system, a tension surge propagates at approximately five thousand meters per second along the tow cable 100 so that the surge detection is transmitted from the location of a snag of the tow cable to the handling system in less than a second. Although there are numerous known methods to detect a tension surge, a tension meter 20 of the towed array safety system 10 is shown in FIG. 1.

The tension meter 20 is located in-line with the sheave 12. When a measured tension in the tow cable 100 exceeds a preset threshold; the tension will be recognized by the tension meter 20 as a tension surge. A software tool of a controller 22 of the towed array safety system 10 is notified of the surge.

Along with the measured tension surge, a rotational inertia is determined by the software tool by the amount of the tow cable 100 stored on the winch 200 and a minimum diameter of the winch. For a small amount of remaining tow cable 100, both the rotational inertia and the torque requirement will be low. The amount of remaining tow cable 100 is estimated by using the number of winch turns during deployment of the tow cable.

If a large amount of the tow cable 100 is stored on the winch 200; an auxiliary motor 24 is required to provide enough torque to overcome the rotational inertia plus a safety factor of additional torque. The estimate of the initial torque leads to the unreeling of enough tow cable 100 to relieve the tension surge but not too much that the entire cable will unreel off the winch 200. In addition to estimating the rotational inertia, the software tool tracks how much of the tow cable 100 is deployed and how much tow cable remains on the winch 200.

The tension is monitored throughout the entire process. The tension surge is considered to be concluded or over when the tension decreases below a threshold value such as the steady-state tension before the surge. Once the tension surge concludes, the rotation of the motor 24 reverses and decreases speed of the winch 200 to prevent loss of the tow cable 100 and the handling system. An amount of reverse torque is also precomputed.

The torque is modeled as based on the diameter of the tow cable 100, the inner diameter of the winch 200, the amount of tow cable on the winch as well as angles $\theta_1$ and $\theta_2$. The software models the tension surge in the tow cable 100 as a function of time. The torque required would accelerate the winch 200 to relieve the tension surge which would be a function of the rotational inertia of the winch itself with the remaining tow cable 100 on the winch.

The present invention can avoid a loss of the towed system in the event of a snagged tow cable. If the tension surge is transient, then the motor 24 can increase the speed of the winch 200 and then gradually slow down the winch before the tow cable 100 completely unreels. The present invention can provide the same safety factor as a much larger handling system and a better measure of safety than a mechanical fuse because the snag of the tow cable 100 can occur between the fuse and the handling system.

The use of the system of the present invention will assist in understanding the relationship between potential cable tension surges and the rotational inertia associated with the tow cable winch thereby preventing design errors in the future.

In alternate uses, the sheave 12 that responds as an over-damped spring-mass system can be used with other tension reduction approaches such as a guillotine or a torch. By increasing a response time, the likelihood of success can increase with the use of the guillotine or the torch.

Also, the entire tow cable handling system can move along a forward and aft direction on rails with the handling system suspended by a horizontal spring and mass system also having an over-damped response. However, this system will have substantially more translational inertia than a reinforced sleeve because of the large mass associated with the remaining cable wound on the winch.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A towed array safety system for controlling the reeling and unreeling of a tow cable from a winch, said towed array safety system comprising:
- a motor operationally connected to the winch for controlling a speed of the winch;
- a sheave for directing the tow cable from the winch wherein said sheave is capable of moving in the vertical direction to relieve tension in the tow cable;
- a tension meter operationally connected to said sheave wherein said tension meter measures tension in the tow cable including a surge in tension in the tow cable;
- a spring and mass device operationally connected to said tension meter with said spring and mass device having a spring element and a dashpot element; and
- a software element operationally connected to said tension meter, said motor and said spring and mass device wherein said software element is capable of determining an estimate of torque to control said motor to speed up the winch for unreeling enough tow cable to relieve the tension surge but not too much that the entire cable will unreel off the winch;
- wherein said spring and mass device is capable of an over-damped response in a vertical direction to time required for said motor to apply the torque to speed up the unreeling of the winch;
- wherein the estimate of the torque is based on overcoming a rotational inertia of the winch with the rotational inertia estimated from an amount of the tow cable stored on the winch and a minimum diameter of the winch;
- wherein a motion in the vertical direction is determined by $m\ddot{x}+c\dot{x}+kx=u_s(t)$ where m is the mass of the sheave, c is the damping of the dashpot element, k is the stiffness of the spring element, $u_s(t)$ is the unit step function and $c^2>4mk$.

2. The towed array safety system in accordance with claim 1 wherein the surge in tension is considered to be over when the tension decreases below a predetermined threshold value such said motor reverses and decreases speed of the winch.

\* \* \* \* \*